April 27, 1937.　　　M. FEDOR, JR　　　2,078,602
RESISTANCE COLOR CODE CHART
Filed Oct. 5, 1935　　　5 Sheets-Sheet 1
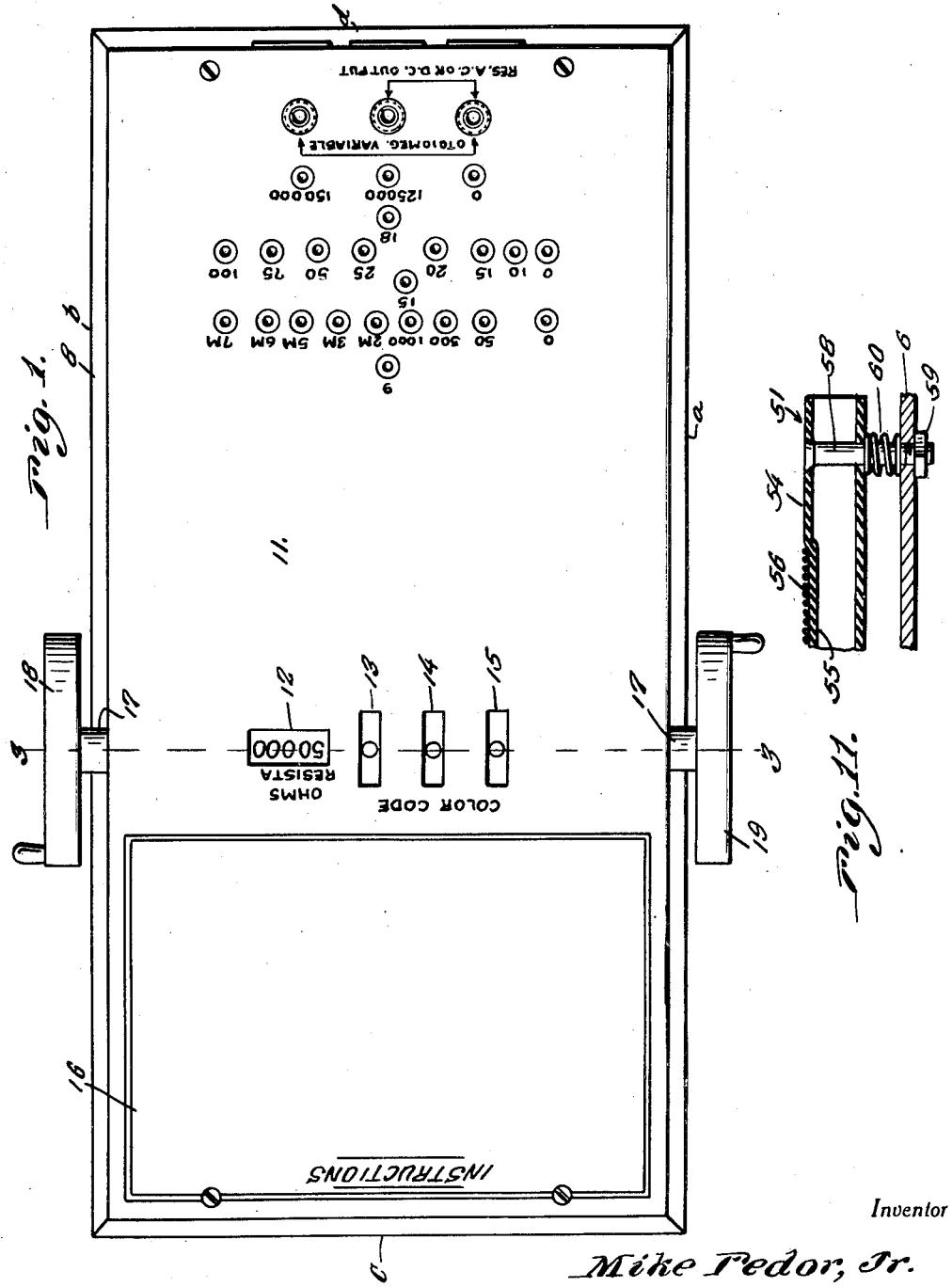
Inventor
*Mike Fedor, Jr.*
By *Clarence A. O'Brien*
Attorney April 27, 1937.   M. FEDOR, JR   2,078,602
RESISTANCE COLOR CODE CHART
Filed Oct. 5, 1935   5 Sheets-Sheet 2
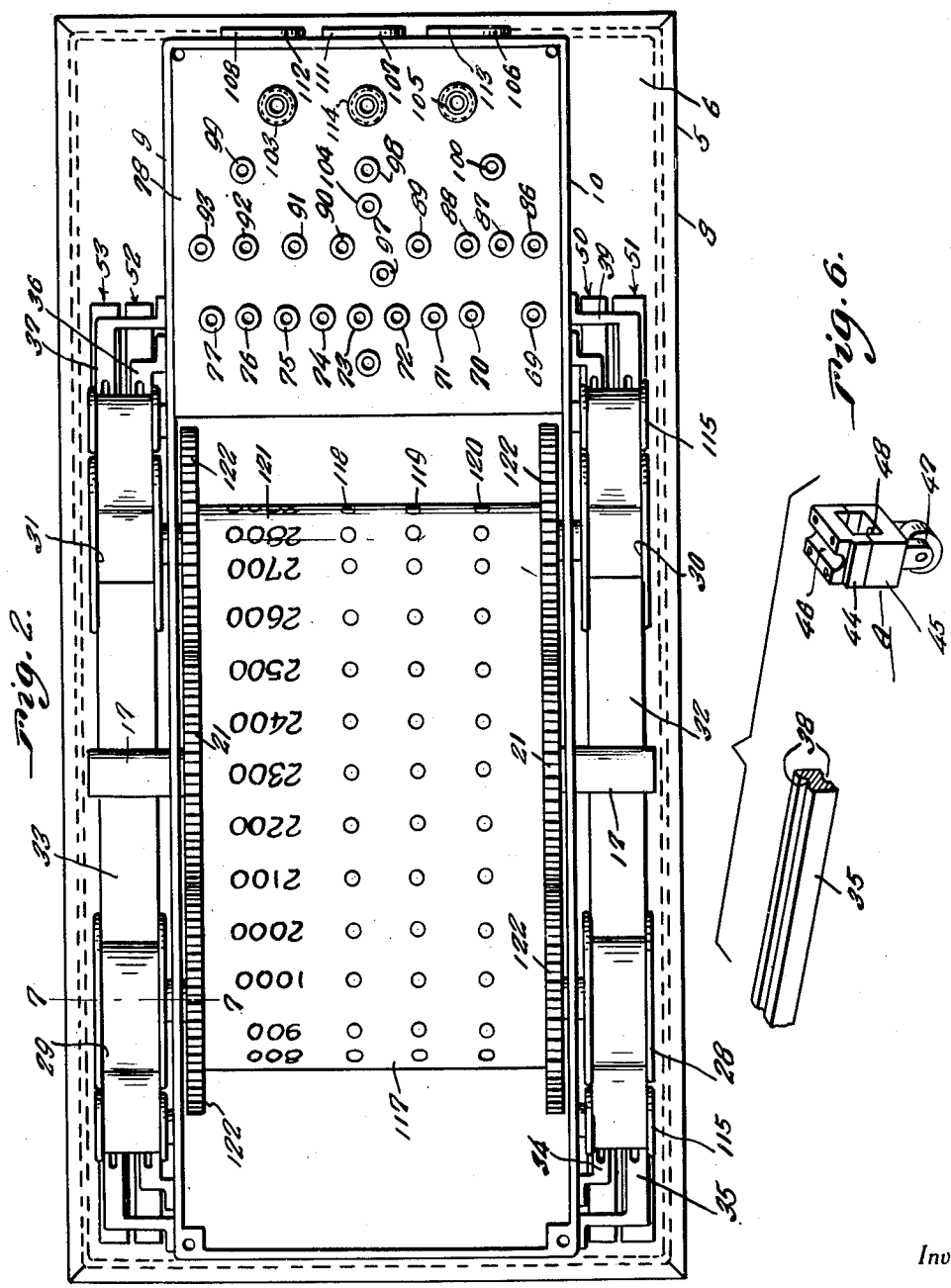
Inventor
Mike Fedor, Jr.
By Clarence A.O'Brien
Attorney April 27, 1937.　　　M. FEDOR, JR　　　2,078,602
RESISTANCE COLOR CODE CHART
Filed Oct. 5, 1935　　　5 Sheets-Sheet 3
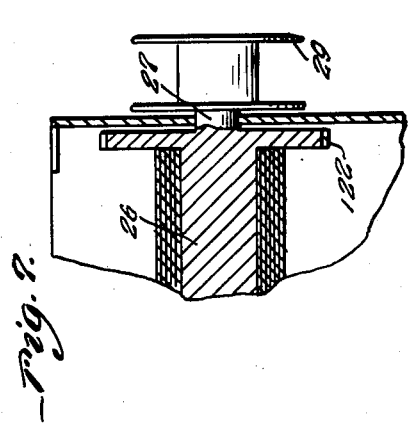
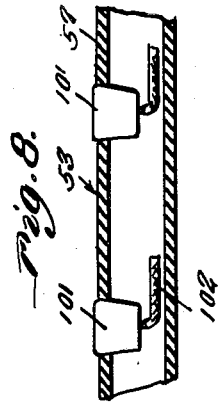
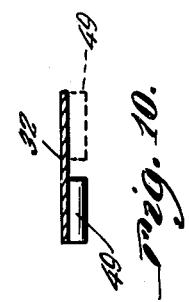
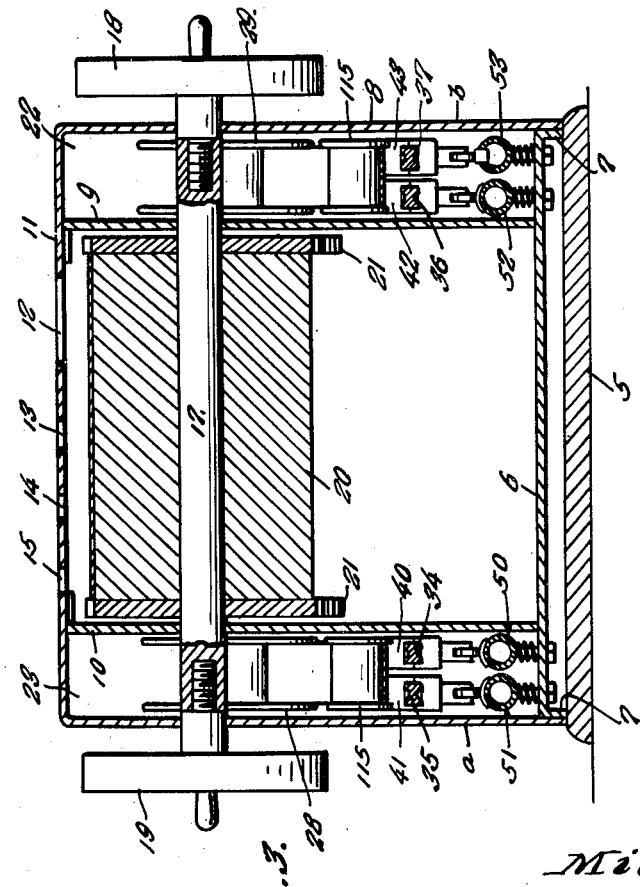
Inventor
Mike Fedor, Jr.
By Clarence A. O'Brien
Attorney

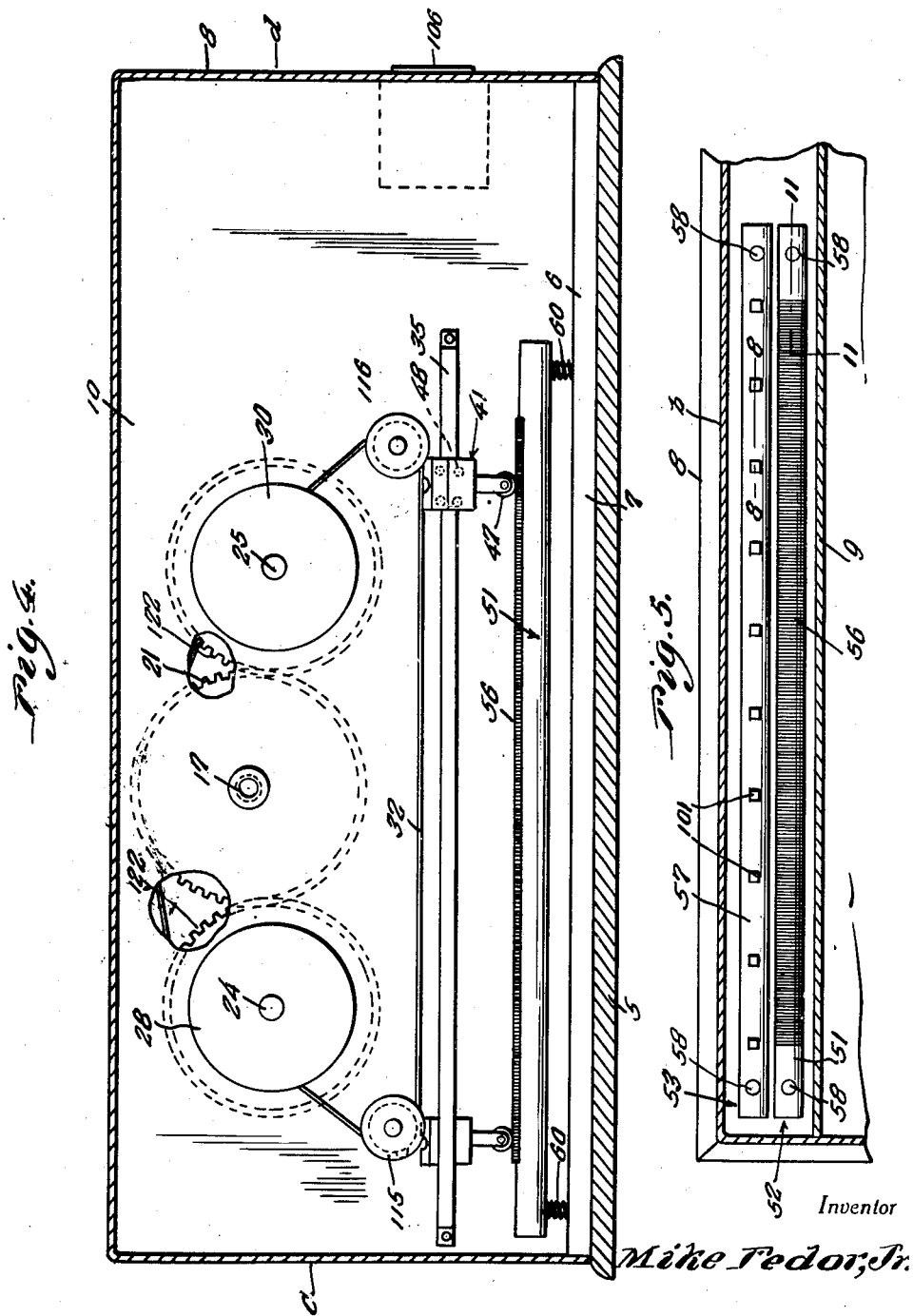

Patented Apr. 27, 1937

2,078,602

UNITED STATES PATENT OFFICE 2,078,602

RESISTANCE COLOR CODE CHART

Mike Fedor, Jr., Dayton, Ohio

Application October 5, 1935, Serial No. 43,799

2 Claims. (Cl. 201—48)

This invention appertains to new and useful improvements in apparatus for determining the ohmic resistance of electrical circuits and instruments.

The principal object of this invention is to provide an apparatus whereby the proper resistance of the circuit or instrument can be determined by interposing the proper resistance and determining the value of this resistance by a color code chart operating coincidentally with the apparatus.

Another important object of the invention is to provide an apparatus whereby various radio circuits and devices can be tested as to the proper resistance required.

Still another important object of the invention is to provide an apparatus for determining the proper resistance of various electrical circuits and instruments wherein the standard R. M. A. resistor color code is used in the form of a mobile chart coactive with the apparatus so that when the proper resistance has been interposed in the circuit being tested its value will be represented by the visible color combination.

During the course of the following specification other important objects and advantages of the invention will become apparent.

In the drawings:

Figure 1 represents a top plan view of the apparatus.

Figure 2 represents a top plan view of the apparatus with the top removed.

Figure 3 is a cross sectional view taken substantially on line 3—3 of Figure 1.

Figure 4 is a longitudinal sectional view through the casing of the apparatus looking at the apparatus in side elevation.

Figure 5 is a fragmentary horizontal sectional view through the apparatus.

Figure 6 is a perspective view of the slidable contactor and also fragmentarily showing the conductor rail therefor.

Figure 7 is a fragmentary vertical sectional view taken substantially on the line 7—7 of Figure 2.

Figure 8 is a fragmentary longitudinal sectional view taken substantially on line 8—8 of Figure 5.

Figure 9 is a fragmentary plan view of one of the webs.

Figure 10 is a cross sectional view taken substantially on line 10—10 of Figure 9.

Figure 11 is a fragmentary longitudinal sectional view taken substantially on line 11—11 of Figure 5.

Figure 12 is a diagrammatic view disclosing the electrical devices and the connections between the same.

Figure 16:
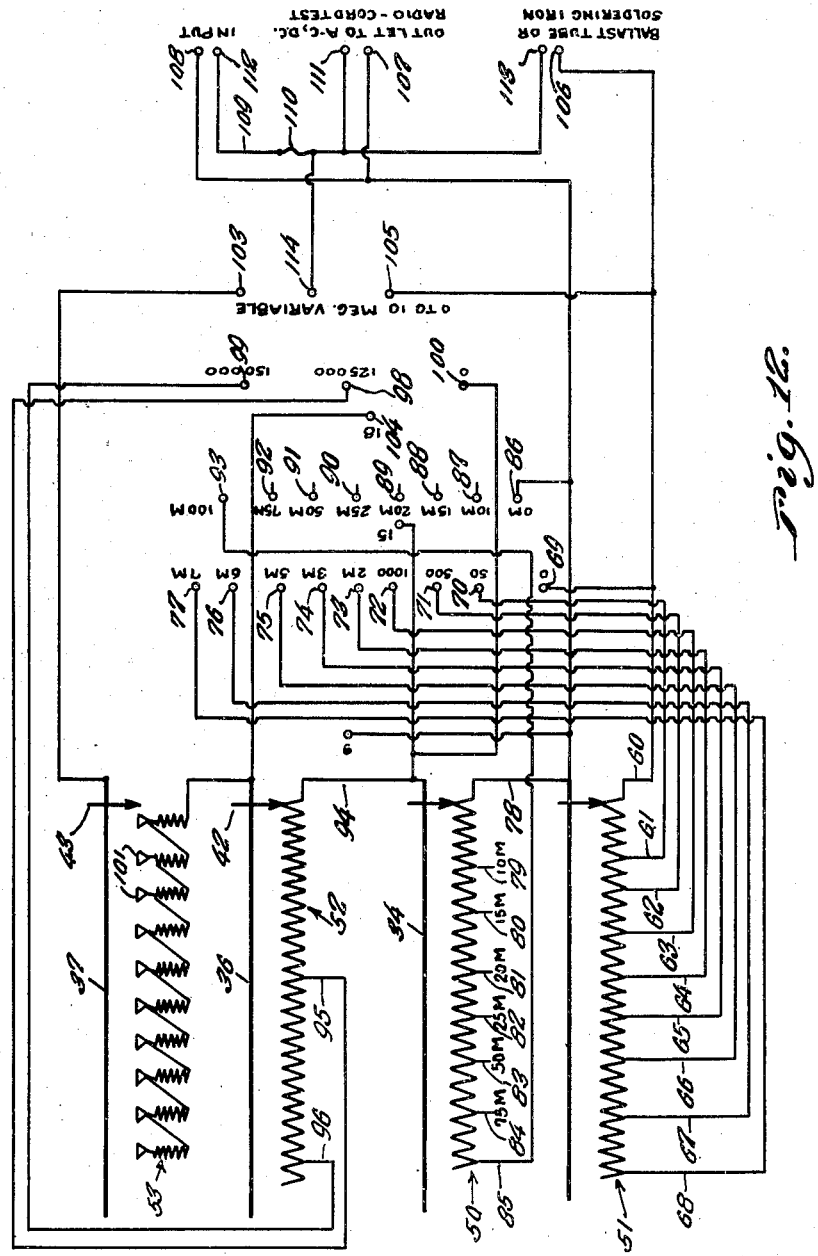

Referring to the drawings wherein like numerals designate like parts, it can be seen in Figures 3 and 4, that the apparatus consists of the elongated base 5 provided with the overlying plate 6 which is supported by downturned flanges 7 resting on the said base 5. Numeral 8 is the casing including the side wall $a$—$b$ and the end walls $c$—$d$. The side and end walls of the casing 8 snugly engage the flanges 7 of the plate 6. This casing 8 is provided with a pair of vertically disposed and longitudinally extending partitions 9—10. This casing 8 is provided with the top 11 which has the transversely elongated sight opening 12 therein and the longitudinally elongated sight openings 13, 14 and 15 adjacent thereto. Upon this top 11 is a suitable detachable plate 16 on which instructions for operating the apparatus are located.

An elongated shaft (see Figure 3) denoted by numeral 17 has its end portions journalled through the partitions 9—10 and the outer ends of the shaft 17 beyond the side walls $a$—$b$ are provided with a hand wheel 18—19 whereby this shaft 17 can be rotated along with the roll 20 carried thereby. Each end of this roll 20 is provided with a gear 21 as shown in Figures 2 and 3.

The partition 9 is sufficiently spaced from the side wall $b$ to provide the compartment 22, while between the partition 10 and the side wall $a$ a similar compartment 23 is afforded.

As shown in Figures 2 and 4, two additional shafts 24—25 are provided, one at each side of the shaft 17 and on each of the shafts 24—25 is a roll 26, the roll 26 at one side of the roll 20 is provided with pintle like extensions 27 carrying the spools 28—29, while the roll 26 at the opposite side of the roll 20 has pintle like extensions carrying the spools 30—31. The spools 28—30 are provided for the elongated ribbon 32 to be wound on while the spools 29—31 is for the ribbon 33 to be wound on.

In the compartment 23 below the spools 28—30 are located the rails 34—35, while in the compartment 22 below the spools 29—31 are located the rails 36—37. Each of these rails is provided with a top and bottom longitudinally extending grooveway 38 and each is provided with laterally bent end portions 39 for attachment to the corresponding partition 9 or 10. On the rails 34, 35, 36 and 37 are located the sliding contactors generally referred to by numerals 40, 41, 42 and 43 respectively. Each of the sliding contactors consists of a block having a rectangular shaped opening therethrough, the block being denoted by A and being divided into upper and lower sections 44—45 suitably secured together. The upper section 44 is provided with a transversely extending groove or notch 46, while a roller 47 is mounted on the bottom of the section 45. The upper and lower sections 44—45 have recesses on the inside thereof for receiving ball bearings 48 which ride in the grooveways 38 of the corresponding conductor rail 35. (See Figures 3 and 6.)

Each of the ribbons 32—33 is provided with small protuberances 49. These protuberances are arranged in two longitudinally extending rows, each row terminating at the longitudinal intermediate portion of the ribbons, the protuberances of one row being alternately arranged across the ribbon with respect to the protuberances of the other row and these protuberances are engageable into the notch at 46 of the corresponding contactors 40—41 or 42—43 by moving the contactors along the corresponding resistor units generally referred to by numerals 50—51 or 52—53 respectively.

The units 50—51—52 are of substantially the same construction, each consisting of an elongated dielectric tube 54 provided each with a depressed longitudinally extending portion 55 in which the resistance element 56 is disposed. Each of these tubes 54 as well as the tube 57 of the resistor 53 is provided with depending pins 58 at their end portions for disposition through openings in the base plate 6 where the pins are threaded and provided with nuts 59 to prevent rising of the pin. Coiled compressible springs 60 are interposed between the lower side portion of the tubes 54—57 and the plate 6 so as to normally urge the tubes upwardly and tensionally against the rollers 47 of the aforementioned contactors.

The resistor 51 has taps 60, 61, 62, 63, 64, 65, 66, 67 and 68 taken therefrom and these taps are connected to the contacts 69, 70, 71, 72, 73, 74, 75, 76 and 77 located on the panel board 78 supported by the partitions 9—10 (see Figure 2).

The resistor 50 has a tap 78 which connects to the conductor rail 35, and taps 79, 80, 81, 82, 83, 84 and 85, which connect respectively to the contacts 86, 87, 88, 89, 90, 91, 92 and 93.

The resistor unit 52 has a tap 94, which connects to the conductor rail 34, taps 95 and 96 which connect to the panel board contacts 99 and 98, respectively. The tap 94 also extends to the zero contact 100.

The resistor 53 which is shown in Figure 8 consists of a plurality of resistance elements 101 embedded in the dielectric tube 57 and connected in series as at 102. The tops of these units are exposed to contacts by the contactor 43. (See Figure 3.) The rail 37 on which the slider 43 operates to engage the resistance element 101 is connected to the panel board contact 103 while one of the endmost resistance elements 101 is connected to the conductor rail 36 which carries the contactor 42 and which in turn is connected to the panel board contact 104.

The tap 60 of the resistor 51 is also connected to the panel board contact 105 and also the panel board contact 106 while the rail 35 is furthermore connected to the panel board contacts 107 and 108. A strap 109 having a fuse 110 therein has branches to the contacts 111, 112 and 113 as well as the contacts 114, all located on the aforementioned panel board 78 and at the front end d of the casing 8.

The outer side of each of the partitions 9—10 has a pair of horizontally spaced pulleys 115—116, so that when the corresponding contactors 40—41 or 42—43 have been moved to the end of the corresponding rails and resistors the protuberances 49 will leave the notches in the contactors and ride up over the contactors onto the corresponding spools 28—30 or 29—31.

Having its ends wound on the rolls 26, is the elongated chart sheet 117 on which are three longitudinally extending rows of colors denoted by numerals 118, 119 and 120 and a row of figures 121 denoting ohm resistance.

These color combinations are based on the R. M. A. standard of resistor color codes.

Obviously by rotating the intermediate roll 20 which has its gears 21 meshing with the gears 122 on the rolls 26, operation of the contactors will be had until the proper resistance is interposed in the instrument or circuit being treated.

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

1. In combination, a casing having a sight opening therein, a movable chart in the casing having color combinations thereon representing different values of resistance, means for actuating the chart, a variable resistance device, said chart being in turn adapted to actuate the variable resistance device, the same consisting of an elongated resiliently supported resistance element and a contactor for riding engagement thereon, a pair of rolls on which the said charts are wound, spool rotated by the said roll, a ribbon fed by the said spool, said ribbon being provided with a plurality of protuberances for engaging and driving the said contactor.

2. In combination, a casing having a sight opening therein, a movable chart in the casing having color combinations thereon representing different values of resistance, means for actuating the chart, a variable resistance device, said chart being in turn adapted to actuate the variable resistance device, the same consisting of an elongated resiliently supported resistance element and a contactor for riding engagement thereon, a pair of rolls on which the said charts are wound, spool rotated by the said roll on which the said charts are wound, a ribbon fed by the said spool, said ribbon being provided with a plurality of protuberances for engaging and driving the said contactor, said contactor consisting of a slidable block provided with a contact roller mounted thereon and engaged with the resistor and having a notch therein for receiving the protuberances on the ribbon.

MIKE FEDOR, Jr.